(12) United States Patent
Geib

(10) Patent No.: US 6,361,243 B1
(45) Date of Patent: Mar. 26, 2002

(54) MOUNTING DEVICE

(75) Inventor: Randall R. Geib, Manhelm, PA (US)

(73) Assignee: Fenner, Inc., Manheim, PA (US)

( * ) Notice: Subject to any disclaimer, the term of this patent is extended or adjusted under 35 U.S.C. 154(b) by 0 days.

(21) Appl. No.: 09/319,638

(22) PCT Filed: Oct. 8, 1997

(86) PCT No.: PCT/US97/18225

§ 371 Date: Jun. 8, 1999

§ 102(e) Date: Jun. 8, 1999

(87) PCT Pub. No.: WO98/15742

PCT Pub. Date: Apr. 16, 1998

Related U.S. Application Data

(60) Provisional application No. 60/028,249, filed on Oct. 9, 1996.

(51) Int. Cl.$^7$ .................................................. F16B 2/14
(52) U.S. Cl. ........................ 403/369; 403/370; 403/371
(58) Field of Search ............................... 403/371, 370, 403/369, 368, 367, 365, 12, 13, 14; 279/42, 47, 48, 52, 56, 156, 87

(56) References Cited

U.S. PATENT DOCUMENTS

| | | | |
|---|---|---|---|
| 1,687,777 A | | 10/1928 | McMurtrie |
| 3,003,149 A | * | 10/1961 | Grashow ................ 403/371 X |
| 4,202,644 A | * | 5/1980 | Soussloff .................... 403/369 |
| 4,345,851 A | | 8/1982 | Soussloff |
| 4,367,053 A | | 1/1983 | Straitenko |
| 4,543,704 A | | 10/1985 | Soussloff |
| 4,600,334 A | | 7/1986 | Soussloff |
| 4,615,640 A | * | 10/1986 | Hosokawa .................. 403/369 |
| 4,623,277 A | * | 11/1986 | Wayne et al. ........... 403/371 X |
| 4,824,281 A | | 4/1989 | Katsube |
| 5,009,539 A | | 4/1991 | Muellenberg |
| 5,374,135 A | * | 12/1994 | Folsom et al. .............. 403/369 |
| 5,474,403 A | * | 12/1995 | Hetrich ....................... 403/369 |
| 5,695,297 A | * | 12/1997 | Geib .......................... 403/371 |

FOREIGN PATENT DOCUMENTS

EP 0 318 977 B1 9/1993

* cited by examiner

Primary Examiner—Harry C. Kim
(74) Attorney, Agent, or Firm—Dann, Dorfman, Herrell and Skillman; Stephen H. Eland

(57) ABSTRACT

A mounting device for coaxially anchoring a machine element upon a rotary shaft. The device fits between the interior bore of the machine element and the cylindrical surface of the shaft and is effective to position the element at any desired position longitudinally of the shaft and at any angular position circumferentially of the shaft. The device has inner and out sleeves, the mating surfaces of which are similarly tapered so that relative axial displacement of the sleeves effects expansion and contraction of the interior bore and external surface of the combined elements. Rotation of a threaded nut at one end of the device effects the relative axial displacement of the inner and outer sleeves to afford expansion and contraction of the outer sleeve.

19 Claims, 3 Drawing Sheets

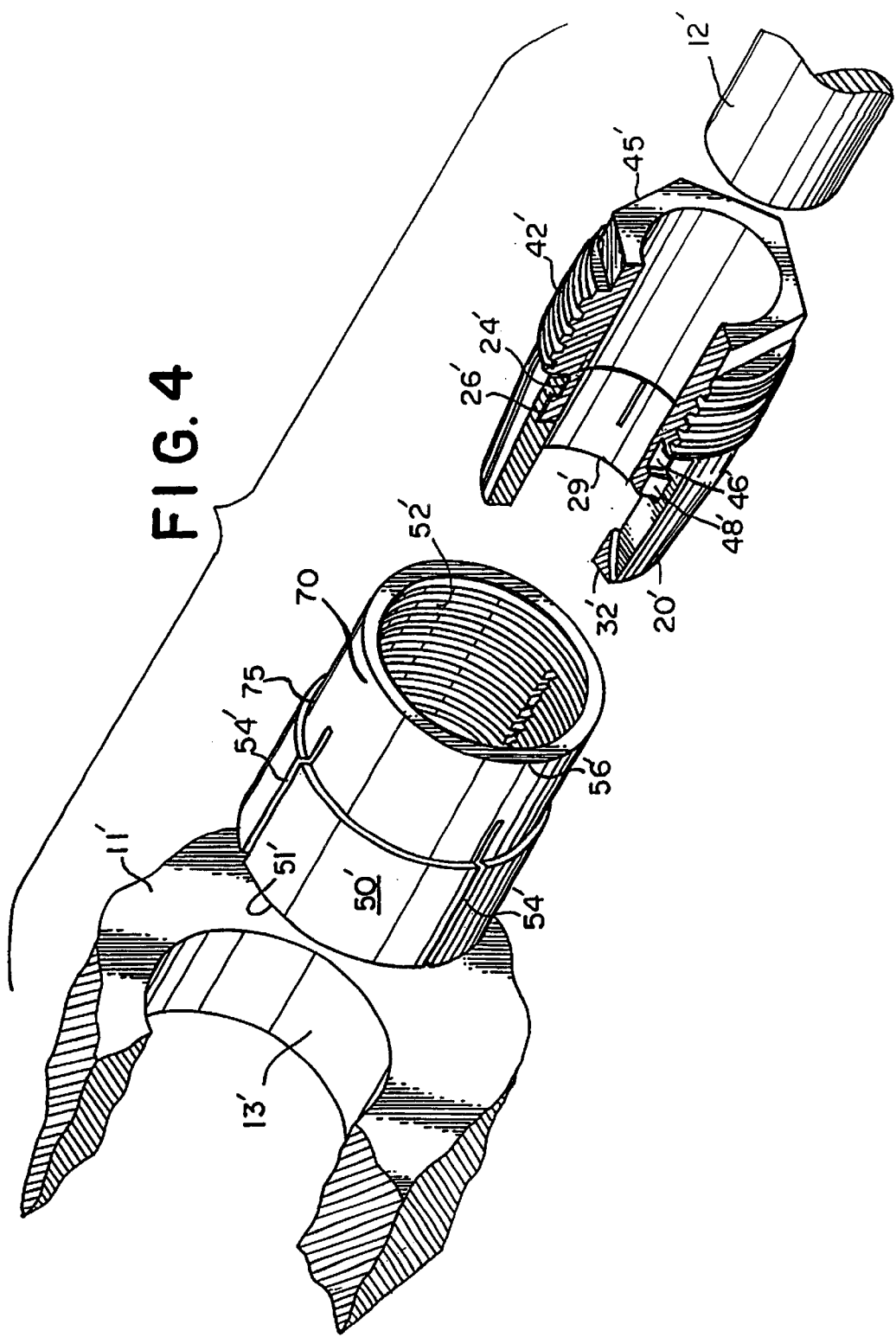

MOUNTING DEVICE

This application claims benefit of provisional application No. 60/028,249, filed Oct. 9, 1996. This application is a 371 of PCT/US97/18225, filed Oct. 8, 1997.

FIELD OF THE INVENTION

The present invention relates to a mounting device for mounting a machine element upon a shaft in such a manner that the rotation of the shaft transmits its entire torque to the machine element without slippage due to the mounting. In particular, the device of the present invention provides an improved mounting device for mounting machine elements permitting infinitely-variable adjustment of the machine element on the shaft, both axially of the shaft and circumferentially thereof, and maintaining the machine element at a fixed, axial position after mounting on the shaft.

BACKGROUND OF THE INVENTION

The use of devices for mounting machine elements, such as pulleys and gears, upon a shaft is well-known. One difficulty is that the known devices for mounting a machine element upon a cylindrical shaft are cumbersome to use. For example, some devices require assembly of multiple pieces and adjustment of several screws, and other devices require modification of the shaft on which the machine element is mounted.

Another difficulty encountered relates to machine elements having undersized bores and oversized shafts. Frequently, due to wear, the internal bore of a machine element may be undersized and, similarly, the diameter of a shaft may be oversized. In these situations, the mounting device must be able to fit within the bore, or over the shaft.

BRIEF DESCRIPTION OF THE DRAWINGS

The foregoing summary, as well as the following detailed description of the preferred embodiments of the present invention, will be better understood when read in conjunction with the appended drawings, in which:

FIG. 4 is a fragmentary exploded perspective view of a second embodiment of a mounting device in accordance with the present invention;

DETAILED DESCRIPTION OF THE PREFERRED EMBODIMENTS

Figure 1:
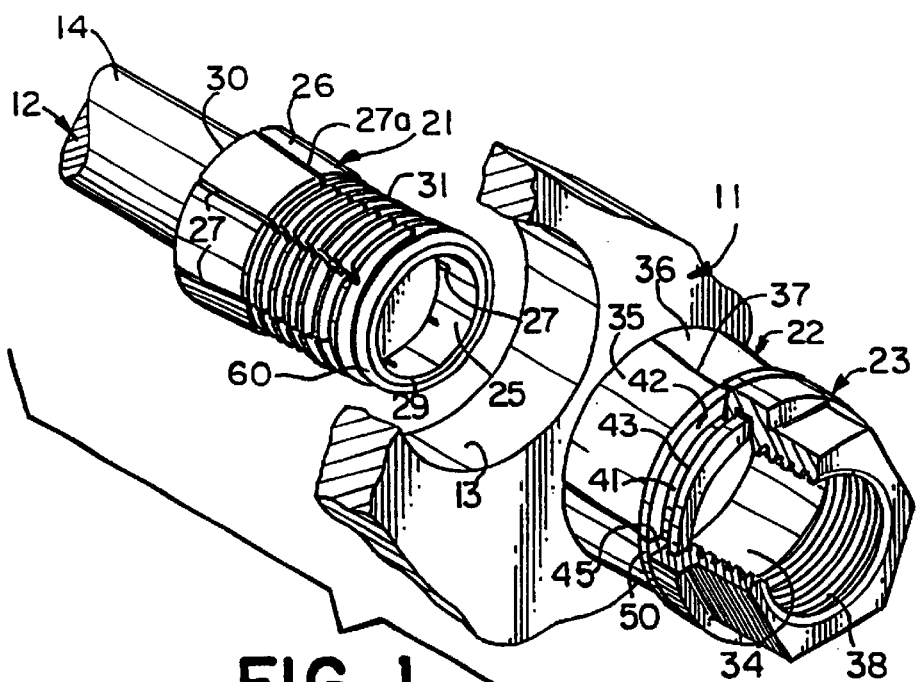
FIG. 1 is a fragmentary exploded perspective view of a mounting device, in accordance with the present invention, in position for coupling a machine element to a shaft.
Figure 3:
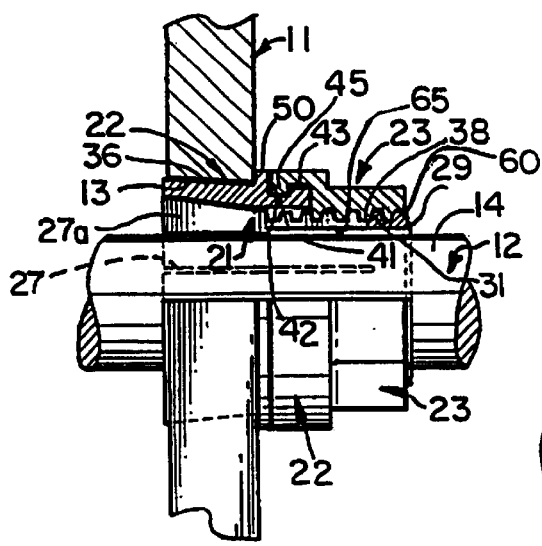
FIG. 3 is a transverse sectional view taken on the section line 3—3 of FIG. 2.
Figure 2:
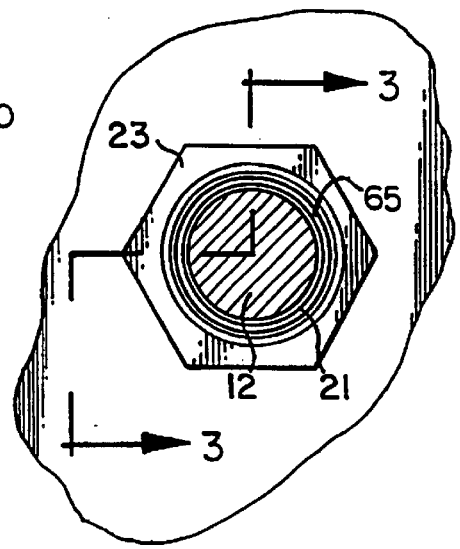
FIG. 2 is an end view of the assembled mounting device as seen from the right-hand end of FIG. 1.

Referring now to the drawings and to FIGS. 1–3 specifically, a mounting device 10 designed to mount the hub of a machine element 11 upon a cylindrical shaft 12 is illustrated. In the present instance, the machine element 11 has a smooth tapered bore 13 whose axis coincides with the axis of the cylindrical surface of the shaft 12. The mounting device is designed to be positioned between the bore 13 and the shaft 12 and to be expanded therein to securely anchor the machine element 11 on the shaft at any desired position axially of the shaft and any angular position circumferentially of the shaft. In the present instance, the bore of the machine element is tapered, however, the bore could alternatively be cylindrical.

The mounting device 10 incorporates an inner sleeve 21, an outer sleeve 22, and a locking nut 23. The inner sleeve 21 is tubular in form having an internal cylindrical bore whose diameter corresponds to the diameter of the shaft 12, the bore being of sufficiently greater diameter than the shaft to permit free sliding movement of the inner sleeve 21 on the shaft both axially and circumferentially, with the proximal end of inner sleeve 21 having a threaded section 31. The distal end of the inner sleeve 21 has an outwardly-tapered external surface 26. A plurality of terminated longitudinally-extending slots 27 are spaced about the periphery of the inner sleeve. As shown in FIG. 1, all of the slots terminate short of the proximal end 29 so that the proximal end of the inner sleeve is a continuous solid ring 60. Referring to FIG. 3, the proximal end of the inner sleeve 21 has an annular recessed portion 65 extending about the entire inner circumference of the sleeve. The recessed portion is larger in diameter than the cylindrical shaft 12. The annular recessed portion 65 is at least coextensive in length with the continuous band 60 of the inner sleeve 21, and preferably is coextensive with the threaded portion 31. The annular recessed portion 65 is sufficiently deep so that the continuous band 60 is thin enough to provide sufficient flexibility for the inner sleeve 21.

The inner sleeve 21 is adapted to fit within the outer sleeve 22 which, in the present instance, is a segmented sleeve having three axial slots 37 extending through the outer sleeve dividing the outer sleeve into three separate segments. Alternatively, the axial slots may be terminated slots so that the outer sleeve 22 is of one-piece construction. The axial slots 37 permit radial deflection of the outer sleeve 22 as the mounting device is tightened and released. The outer surface of the outer sleeve 22 is tapered having a taper that corresponds to the tapered bore 13 of the machine element 11, the diameter of the outer sleeve being of sufficiently smaller diameter than the bore to permit free sliding movement between the machine element and the outer sleeve when the mounting device is not tightened. Alternatively, if the machine element has a cylindrical bore, the outer surface of the outer sleeve is cylindrical to correspond to the machine element bore.

As shown in FIG. 3, the inner surface of the outer sleeve 22 tapers toward the forward end at the same angle of taper as the inner sleeve 21. In this way, when outer sleeve 22 is rearwardly-displaced relative to the inner sleeve 21 (i.e., from right to left in FIG. 3), the tapered surfaces of the inner and outer surfaces cooperate to expand the external tapered surface of the outer sleeve and contract the internal cylindrical surface of the inner sleeve, the contraction and expansion of the surfaces being substantially parallel to the common central axis of the assembly.

As shown, the rearward end of the outer sleeve 22 has a circumferential interlock that engages an annular groove in the nut 23. The outer sleeve 22 is displaced relative to the inner sleeve 21 by means of the nut 23. To this end, as illustrated in FIGS. 1 and 3, the nut has internal threads 38 which threadedly engage the threads 31 of the inner sleeve 21. Rotating the nut 23 axially displaces the nut relative to the inner sleeve. Because the outer sleeve is connected to the nut, the outer sleeve is displaced relative to the inner sleeve as the nut is displaced.

The continuous band 60 of the inner sleeve provides greater thread strength and improved threaded engagement with the nut 23, relative to a sleeve that is split along the entire axial length. In addition, by providing with the annular groove 65 the inner sleeve 21 retains sufficient flexibility so that the distal end 30 adjacent the tapered surface 26 can flex over the shaft 12 if the shaft is slightly oversized. Further, the annular recessed portion 65 provides a clearance recess so that the continuous band 60 can slide over the shaft 12 if the shaft is oversized.

Figure 5:
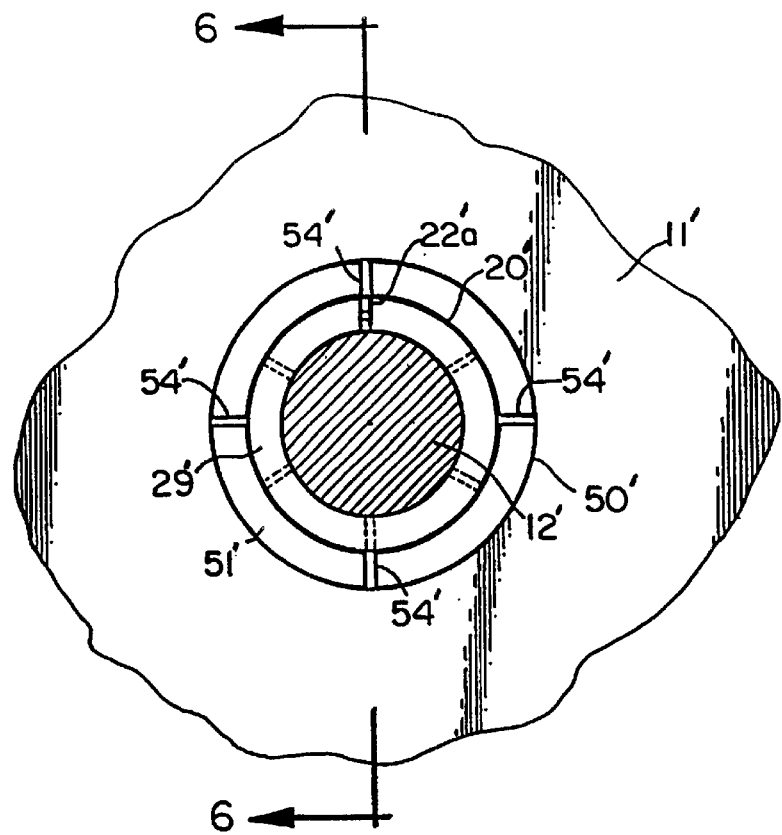
FIG. 5 is an end view of the assembled mounting device as seen from the left-hand end of FIG. 4.
Figure 6:
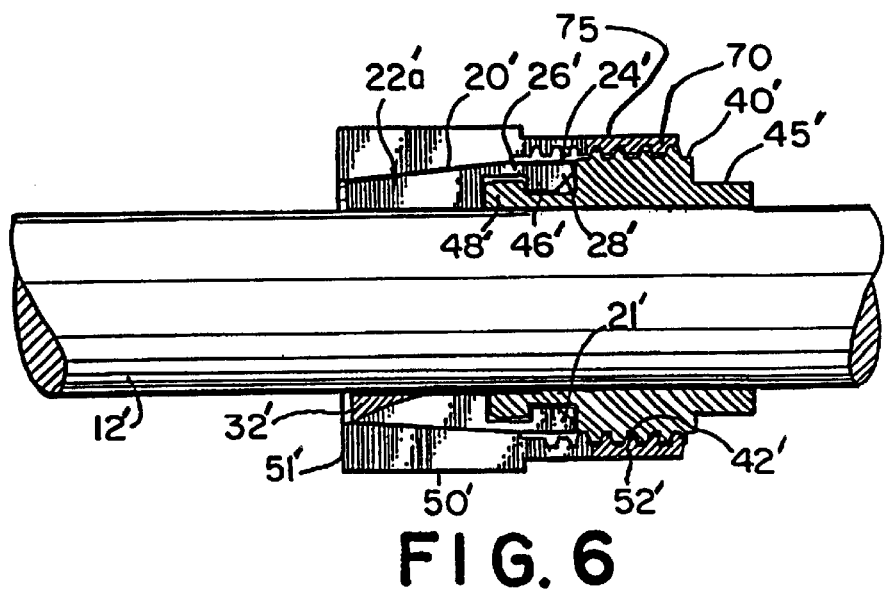
FIG. 6 is a transverse sectional view taken on the section line 6—6 of FIG. 5.

Referring now to FIGS. 4–6, a second embodiment for a mounting device is illustrated. The second embodiment 10' is shown in combination with a cylindrical shaft 12' and a machine element 11' having a cylindrical bore 13'. The second embodiment 10' has an inner sleeve 20', an outer sleeve 50', and a nut 45'.

The inner sleeve 20' has a cylindrical bore corresponding to the diameter of the shaft 12'. An internal groove 26' and an inwardly-projecting flange 24' adjacent the proximal end of the inner sleeve 20' form a circumferential interlock that engage the nut 45'. The external diameter of the inner sleeve has a tapered surface that mates with the outer sleeve 50'. In the present instance, the inner sleeve is of one-piece construction having a series of terminated slots 22a' forming a web 32'. The web 32' is configured so that the interlock of the inner sleeve can resiliently expand over an outwardly-extending flange 48' of the nut 45'.

The outer sleeve 50' has an internally-threaded section 52' adjacent the proximal end 56' of the outer sleeve. The distal end of the outer sleeve has a tapered surface for mating engagement with the external tapered surface of the inner sleeve.

A series of terminated axially-extending slots 54' are circumferentially spaced about the circumference of the outer sleeve 50'. All of the slots 54' terminate short of the proximal end of the outer sleeve 50' so that the proximal end of the outer sleeve has a continuous band 70'. In addition, the outer sleeve has an annular recessed portion 75' on the outer surface adjacent the proximal end. The external recessed portion 75' is at least coextensive with the continuous band 70' and is preferably coextensive with the internal threads 52'.

The outer sleeve 50' is displaced relative to the inner sleeve 20' by means of the nut 40'. To this end, as illustrated in FIGS. 4 and 6, the nut 40' has external threads 42' which threadedly engage the threads 52' of the outer sleeve 50'. Rotating the nut 40' displaces the nut axially relative to the outer sleeve. Because the inner sleeve 20 is connected to the nut, the inner sleeve is displaced relative to the outer sleeve as the nut is displaced. In this way, rotating the nut in a forward direction displaces the outer sleeve relative to the inner sleeve so that the tapered surfaces of the inner and outer sleeves cooperate to expand the external surface of the outer sleeve to engage the bore 13' and contract the internal surface of the inner sleeve to engage the shaft 12'.

The continuous band 70' of the outer sleeve provides greater thread strength and improved threaded engagement with the nut 40', relative to a sleeve that is split along the entire axial length. In addition, by providing the annular recessed portion 75', the outer sleeve 50' retains sufficient flexibility so that the distal end adjacent the internally-threaded surface can flex inwardly into the bore 13' if the bore is slightly undersized. In addition, the annular recessed portion 75' provides a clearance recess so the continuous band 70' can fit within the bore 13 if the bore is undersized.

What is claimed is:

1. A device for coaxially mounting a machine element having a bore upon a shaft comprising:

(a) a one-piece outer sleeve for engaging the machine element, said outer sleeve having a tapered internal surface and an external surface corresponding to the bore of the machine element, said outer sleeve having at least one axial slot extending longitudinally along said outer sleeve to permit expansion of the external surface of said outer sleeve, said slot terminating short of the proximal end of the outer sleeve so that the proximal end is a continuous solid ring, said outer sleeve also having internal threads adjacent the proximal end, and an external annular recess at least coextensive in length with the length of said continuous ring;

(b) a nut having external threads at one end;

(c) a one-piece inner sleeve for encircling the shaft, said inner sleeve having a tapered external surface corresponding in angle of taper to the tapered internal surface of said outer sleeve, an interior bore corresponding in diameter to the shaft, and a circumferential interlock engaging said nut, said inner sleeve having a plurality of axial slots extending longitudinally along said inner sleeve;

wherein upon rotation of said nut, said external threads of said nut engage with said internal threads of said outer sleeve effecting axial displacement of said outer sleeve in one direction relative to said nut, and said nut engages said inner sleeve effecting axial displacement of said inner sleeve in an opposite direction, the displacements causing the internal bore of said inner sleeve to contract against the cylindrical shaft and the external surface of said outer sleeve to expand against the bore of the machine element.

2. A device for coaxially mounting a machine element having a bore upon a shaft, comprising:

(a) an inner sleeve for encircling the shaft, the inner sleeve having a tapered external surface and an interior bore corresponding in diameter to the cylindrical shaft, the inner sleeve having an axial slot extending longitudinally along the inner sleeve to permit contraction of the interior bore, the slots terminating short of the proximal end so that the proximal end is a continuous ring, the proximal end of said inner sleeve also having external threads and an annular recess at least coextensive in length with the length of the continuous solid ring;

(b) an outer sleeve for encircling the inner sleeve having a tapered internal surface corresponding in angle of taper to the tapered external surface of the inner sleeve and a tapered external surface corresponding to the tapered bore of the machine element, the outer sleeve having an axial slot extending longitudinally along the outer sleeve to permit expansion of the tapered external surface of the outer sleeve; and (c) a nut having interior threads and a circumferential forward drive surface such that upon rotation of the nut the interior threads of the nut engage with the external threads of the inner sleeve effecting axial displacement of the inner sleeve in one direction relative to the nut and the forward drive surface of the nut engages with the outer sleeve effecting axial displacement of the outer sleeve in an opposite direction, the displacements causing the interior bore of the inner sleeve to contract against the cylindrical shaft and the tapered cylindrical surface of the outer sleeve to expand against the bore of the machine element.

3. A device for mounting a machine element having a bore upon a shaft, comprising:

a. an inner sleeve for encircling the shaft, comprising:
   an internal bore;
   a tapered exterior surface;
   a continuous solid band extending around the circumference of the inner sleeve;
   an interior clamping portion configured to engage the shaft;
   an external threaded portion;
   a relieved interior bore section that is substantially coextensive with the continuous band, such that the relieved interior bore section has an internal diameter that is greater than the internal diameter of the inner sleeve internal bore adjacent the clamping portion b. an outer sleeve for engaging the machine element, comprising:
   a tapered interior surface having a taper corresponding to the exterior tapered surface of the inner sleeve;
   an exterior engagement surface configured to engage the bore of the machine element;
   an axial slot extending longitudinally along the sleeve to permit expansion of the outer sleeve;

c. a nut having internal threads threadedly engaging the external threaded portion of the inner sleeve;

wherein rotation of the nut in a first direction axially displaces the inner sleeve toward the outer sleeve causing the interior clamping portion of the inner sleeve to clamp onto the shaft, and causing the outer sleeve to expand outwardly so that the exterior surface of the outer sleeve engages the bore of the machine element.

4. The device of claim 3 wherein the relieved interior bore section is coextensive with the external threaded portion.

5. The device of claim 3, wherein the nut comprises a circumferential flange in operative engagement with the outer sleeve.

6. The device of claim 3 wherein the outer sleeve comprises a plurality of segments separated by a plurality of axial slots that extend along the outer sleeve.

7. The device of claim 6 wherein each segment comprises a radial flange that engages the nut.

8. The device of claim 3 wherein the exterior surface of the outer sleeve is generally tapered.

9. The device of claim 3 wherein the exterior surface of the outer sleeve is substantially cylindrical.

10. The device of claim 3 wherein rotation of the nut in a second direction opposite the first direction displaces the inner sleeve away from the outer sleeve causing the interior clamping portion of the inner sleeve to be displaced away from the shaft, and causing the outer sleeve to contract inwardly so that the exterior surface of the outer sleeve releases the bore of the machine element.

11. The device of claim 3 comprising an axial slot extending along the length of the inner sleeve, terminating adjacent the continuous band.

12. A device for mounting a machine element having a bore upon a shaft, comprising:

a. an inner sleeve for encircling the shaft, comprising:
   an internal bore;
   a tapered exterior surface;
   an interior clamping portion configured to engage the shaft;

b. an outer sleeve for engaging the machine element, comprising:
   a tapered interior surface having a taper corresponding to the exterior tapered surface of the inner sleeve;
   an exterior engagement surface configured to engage the bore of the machine element;
   a continuous solid band extending around the circumference of the outer sleeve;
   an axial slot extending longitudinally along the sleeve to permit expansion of the outer sleeve;
   an internal threaded portion;
   a relieved exterior section that is substantially coextensive with the continuous band, wherein the relieved exterior section has an external diameter that is smaller than the external diameter of the outer sleeve engagement surface; and c. a nut having external threads threadedly engaging the internal threaded portion of the outer sleeve;

wherein rotation of the nut in a first direction axially displaces the inner sleeve toward the outer sleeve causing the interior clamping portion of the inner sleeve to clamp onto the shaft, and causing the outer sleeve to expand outwardly so that the engagement surface of the outer sleeve engages the bore of the machine element.

13. The device of claim 12 wherein the relieved exterior bore section is coextensive with the internal threaded portion.

14. The device of claim 12 wherein the nut comprises a circumferential flange in operative engagement with the inner sleeve.

15. The device of claim 12 wherein the inner sleeve comprises a plurality of segments separated by a plurality of axial slots that extend along the inner sleeve.

16. The device of claim 15 wherein each segment comprises a radial flange that engages the nut.

17. The device of claim 12 wherein the engagement surface of the outer sleeve is generally tapered.

18. The device of claim 12 wherein the engagement surface of the outer sleeve is substantially cylindrical.

19. The device of claim 12 wherein rotation of the nut in a second direction opposite the first direction displaces the inner sleeve away from the outer sleeve causing the interior clamping portion of the inner sleeve to be displaced away from the shaft, and causing the outer sleeve to contract inwardly so that the engagement surface of the outer sleeve releases the bore of the machine element.

* * * * *

UNITED STATES PATENT AND TRADEMARK OFFICE
CERTIFICATE OF CORRECTION

PATENT NO.    : 6,361,243 B1
DATED         : April 5, 2002
INVENTOR(S)   : Geib

It is certified that error appears in the above-identified patent and that said Letters Patent is hereby corrected as shown below:

<u>Column 3,</u>
Line 63, "so the" should read -- so that the --;
Line 20, delete "engagement";
Line 23, "sleeve;" should read -- sleeve; and --;

Signed and Sealed this

Third Day of September, 2002

*Attest:*

*Attesting Officer*

JAMES E. ROGAN
*Director of the United States Patent and Trademark Office*